United States Patent [19]

Yamashita et al.

[11] Patent Number: 5,546,127
[45] Date of Patent: *Aug. 13, 1996

[54] SOLID-STATE IMAGING APPARATUS

[75] Inventors: Masahiro Yamashita; Norihiko Kawada; Satoshi Nakamura, all of Kanagawa, Japan

[73] Assignee: Sony Corporation, Tokyo, Japan

[*] Notice: The term of this patent shall not extend beyond the expiration date of Pat. No. 5,438,365.

[21] Appl. No.: 427,455

[22] Filed: Apr. 24, 1995

Related U.S. Application Data

[62] Division of Ser. No. 340,802, Nov. 16, 1994, Pat. No. 5,438,365, which is a continuation of Ser. No. 29,070, Mar. 10, 1993, abandoned.

[30] Foreign Application Priority Data

Mar. 18, 1992 [JP] Japan ................................... 4-091420
Mar. 26, 1992 [JP] Japan ................................... 4-098576

[51] Int. Cl.⁶ .................................................. H04N 5/335
[52] U.S. Cl. ........................................... 348/297; 348/322
[58] Field of Search .................................... 348/297, 305, 348/312, 314, 317, 299, 302, 303, 311, 312, 319, 320, 322, 323, 324; H04N 5/335

[56] References Cited

U.S. PATENT DOCUMENTS 3,932,775 1/1976 Kosonocky ............................ 348/314
4,761,689 8/1988 Takatsu et al. ........................ 348/311
4,800,435 1/1989 Ikeda et al. ........................... 348/296
4,839,735 6/1989 Kyomasu et al. ..................... 348/297
5,438,365 8/1995 Yamashita et al. .................... 348/297

FOREIGN PATENT DOCUMENTS

286123 10/1988 European Pat. Off. ......... H04N 3/14
0505117 9/1992 European Pat. Off. ......... H04N 3/15
63-209280 8/1988 Japan ............................. H04N 5/335
2185166 7/1987 United Kingdom ............. H04N 3/15

*Primary Examiner*—Wendy Garber
*Assistant Examiner*—Tuan U. Ho
*Attorney, Agent, or Firm*—Jay H. Maioli

[57] ABSTRACT

A solid-state imaging apparatus capable of changing a vertical resolution (MTF) without damaging the dynamic resolution. A CCD drive circuit 6 for driving a CCD image sensor 2 of an imaging section 3 is controlled by a control section 7 to independently vary effective charge storage periods of respective photoelectric conversion of the CCD image sensor 2 with respect to photoelectric conversion of odd columns and photoelectric conversion elements of even columns and to add and mix, every field, image pick-up charges obtained by respective adjacent photoelectric conversion elements of odd and even columns to read them out. A CCD drive circuit 6 for driving a CCD image sensor 2 of an imaging section 3 may also be controlled by a control section 7 to carry out control of the electronic shutter function of the CCD image sensor 2, and to control the effective charge storage periods of respective photoelectric conversion elements in a manner caused to interlock with the electronic shutter function.

12 Claims, 8 Drawing Sheets

SOLID-STATE IMAGING APPARATUS

This is a division of application Ser. No. 08/340,802, filed Nov. 16, 1994, U.S. Pat. No. 5,438,365, which is a continuation of application Ser. No. 08/029,070, filed Mar. 10, 1993, now abandoned.

BACKGROUND OF THE INVENTION

1. Field of the Invention

This invention relates to a solid-state imaging or image pickup apparatus adapted to pick up an image of an object by a solid-state image sensor in which photoelectric conversion elements are arranged in a matrix form, which is applied to a television camera apparatus of the standard television system, e.g., the NTSC (National Television System Committee) system, PAL system etc, where an interlaced scanning is carried out.

Such standard television systems such as the NTSC system, etc., use interlaced scanning in which scanning lines of odd fields and scanning lines of even fields are alternately positioned.

2. Description of the Prior Art

In a solid-state imaging apparatus using a solid-state image sensor such as a CCD (Charge Coupled Device) in which photoelectric conversion elements are arranged in a matrix form, approaches have been employed to allow the sensor to be operative in an operational mode called a field readout mode or an operational mode called a frame readout mode, both of which produce an image pickup output of the interlaced scanning type.

Figure 6:
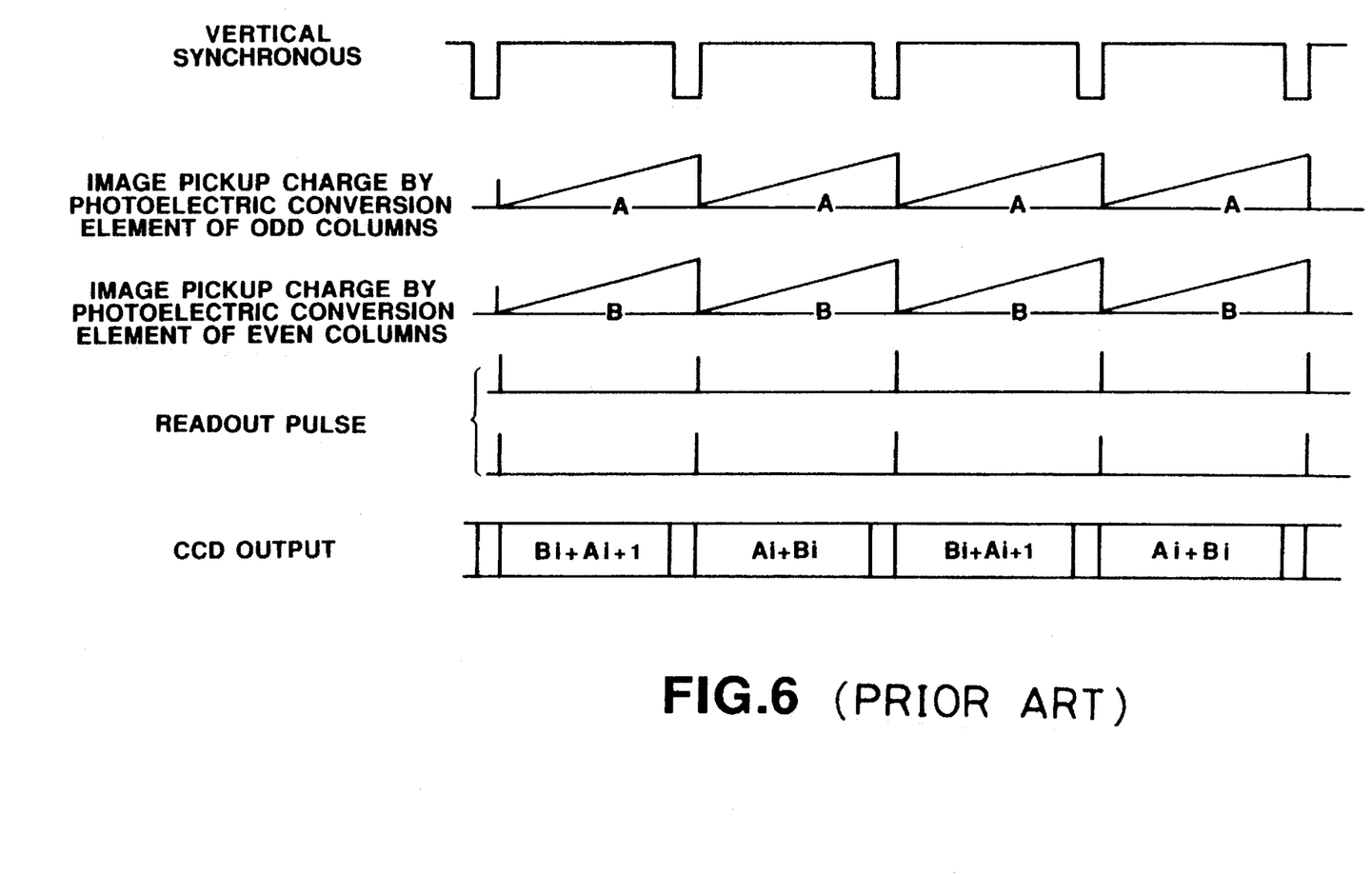
FIG. 6 is a timing chart showing the operation in a field readout mode.

For example, in an interline transfer type CCD image sensor, in operation in the field readout mode, as shown in FIG. 6 of the accompanying drawings, image pickup charges $A_i$ from photoelectric conversion elements of odd columns and image pickup charges $B_i$ from photoelectric conversion elements of even columns (which are respectively adjacent to each other) are transferred to vertical transfer registers by using readout pulses every vertical blanking period. Charges from vertically adjacent pairs of photoelectric conversion elements (odd and even) are added together, with the pairing being alternated each field (so that a given charge is added to the charge from above in one field and to the charge below the next field) to line-sequentially read out image pickup charges $(A_i+B_i)$ then $(B_i+A_{i+1})$ in successive fields. The charges are transferred through a horizontal transfer register from the vertical transfer registers during an image period to thereby obtain an image pickup output corresponding to the interlaced scanning.

Figure 7:
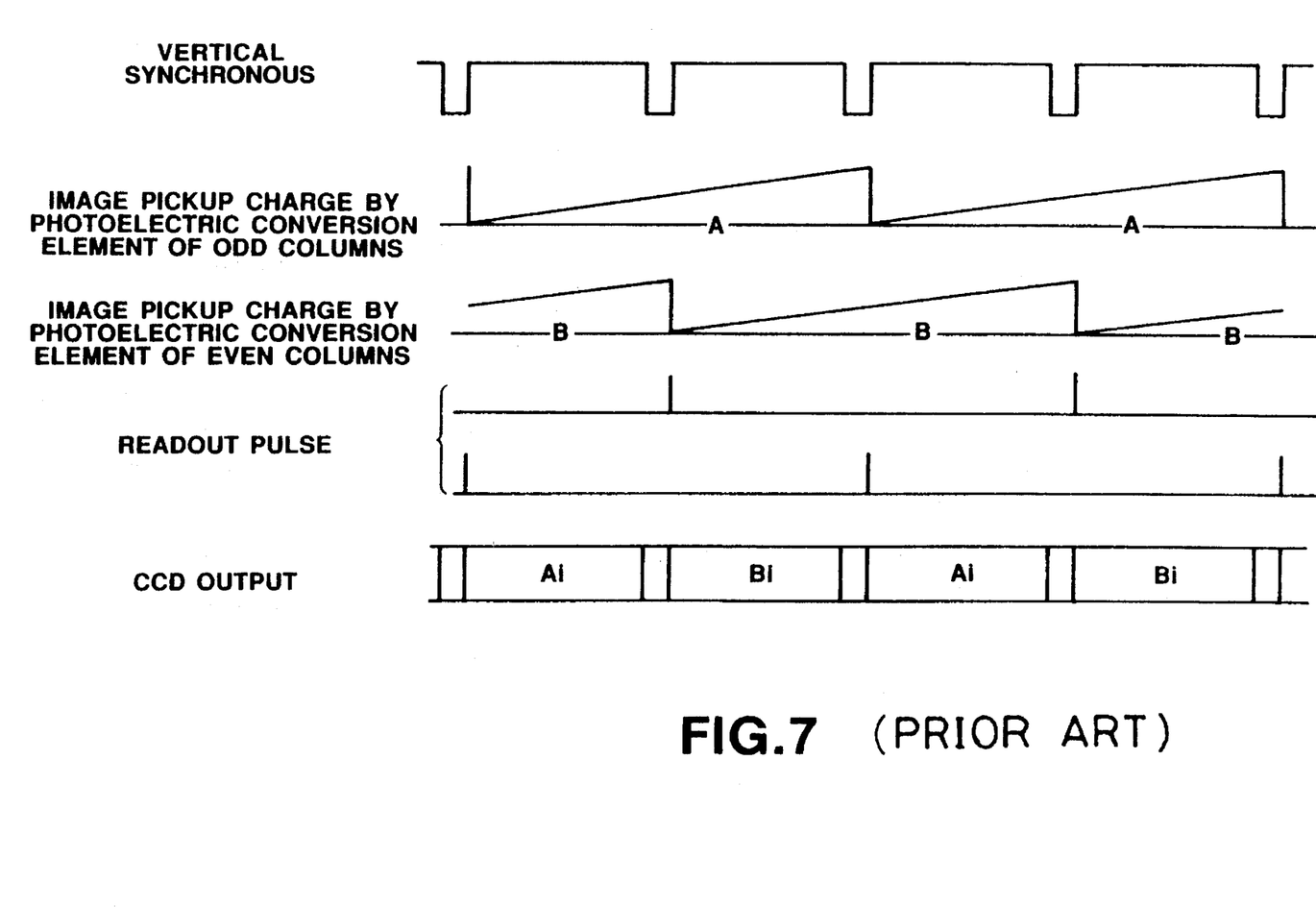
FIG. 7 is a timing chart showing the operation in a frame readout mode.

In the case of the operation in the frame readout mode, an approach is employed as shown in FIG. 7 to transfer, by using readout pulses every vertical blanking period, image pickup charges $A_i$ from photoelectric conversion elements of odd columns and image pickup charges $B_i$ from photoelectric conversion elements of even columns to the vertical transfer registers in alternate intervals. Then one after another every field those image pickup charges $A_i$, $B_i$ of respective fields are line-sequentially read out through the horizontal transfer register from the vertical transfer registers during an image period to thereby obtain an image pickup output corresponding to the interlaced scanning.

In addition, it has also been proposed to provide an electronic shutter function for such image sensors in which, in the above-mentioned field readout mode, control pulses are applied to sweep away image pickup charges obtained by respective photoelectric conversion elements into the overflow drain, thereby permitting effective charge storage periods, and thus the effective shutter speed, to be variable.

However, the above techniques have certain disadvantages. In the field readout mode, since the addition and mixing of image pickup charges $A_i$ of odd columns and image pickup charges $B_i$ of even columns lowers the vertical resolution (Modulation Transfer Function or MTF).

In the frame readout mode, though, as the image pickup charges $A_i$ of odd columns and image pickup charges $B_i$ of even columns adjacent thereto are separately read out, the vertical resolution (MTF) is improved compared to the field readout mode, but there are problems that with moving pictures there results an increased after-image and that the dynamic range becomes approximately one half, because of the increased charge pickup time. In addition, in the case of the frame readout mode, the flicker caused by the interlaced scanning tends to become conspicuous.

OBJECTS AND SUMMARY OF THE INVENTION

In view of problems with conventional solid-state imaging apparatus as described above, it is an object of this invention to provide a solid-state imaging apparatus capable of improving the vertical resolution (MTF) with less reduction of the dynamic resolution.

It is a further object of the invention to provide an imaging system in which the effect of an electric shutter function on the visual resolution can be reduced.

To solve the above-described problems, a solid-state imaging apparatus according to this invention is characterized by the provision of a solid-state image sensor in which photoelectric conversion elements are arranged in a matrix form; and image sensor drive control means adapted to carry out a control to independently change effective storage periods of the respective odd and even photoelectric conversion elements of the solid-state image sensor to add and mix, every field, image pickup charges obtained by respective adjacent odd and even photoelectric conversion elements in different proportions.

This may be achieved by providing additional read-out pulses (sensor gate pulses) in between the existing sensor gate pulses for, alternately, first the odd sensor elements then, in the next field, the even sensor elements. Thus in each field one set of sensor elements is making a full contribution of charge in the adding and mixing, while the other is reduced because their effective charges storage time was reduced by the extra intermediate read-out pulse.

Preferably on application of the additional read-out pulse the charge stored up to that point is transferred at high speed and swept away by a high speed horizontal pulse (in the horizontal transfer register of an FIT type CCD).

Where an electronic shutter function is provided the additional read-out signals may be in timed relation to the shutter signals. This allows the mixing ratio of contributions respectively from the odd and even elements to be varied from the normal 1:1 in order to improve the virtual resolution, but avoids the shutter signal deleteriously affecting the vertical resolution.

In one embodiment, the image sensor drive control means carries out control to read out image pickup charges obtained by photoelectric conversion elements of odd columns and image pickup charges of even columns of a solid-state image sensor of the frame interline transfer type to the vertical transfer registers of the imaging section one after another every field during, for example, in the middle of an image period. This may follow, and be in timed relation to, a shutter signal. Then it transfers, at a high speed, those image pickup charges from the vertical transfer registers of the imaging section to the vertical transfer registers of the storage section during a vertical blanking period every field. Then it line-sequentially transfers, at a high speed, image pickup charges through the horizontal transfer register section from the vertical transfer registers of the storage section to sweep them out. For production of the image signal, the drive control means adds and mixes image pickup charges obtained by the photoelectric conversion elements of the odd columns and the photoelectric conversion elements of the even columns adjacent thereto during a vertical blanking period every field and reads out these added and mixed image pickup charges to the vertical transfer registers of the imaging section. It then transfers, at a high speed, those image pickup charges to the vertical transfer registers of the storage section, and line-sequentially reads out image pickup charges through the horizontal transfer register section from the vertical transfer registers of the storage section.

The adding and mixing of charge from adjacent elements may be effected before or after transfer.

The invention will be further described by way of example in the following description of illustrative embodiments given with reference to the accompanying drawings.

DESCRIPTION OF THE PREFERRED EMBODIMENTS

Embodiments of a solid-state imaging apparatus according to this invention and also according to the prior art will now be described in detail with reference to the attached drawings.

Figure 1:
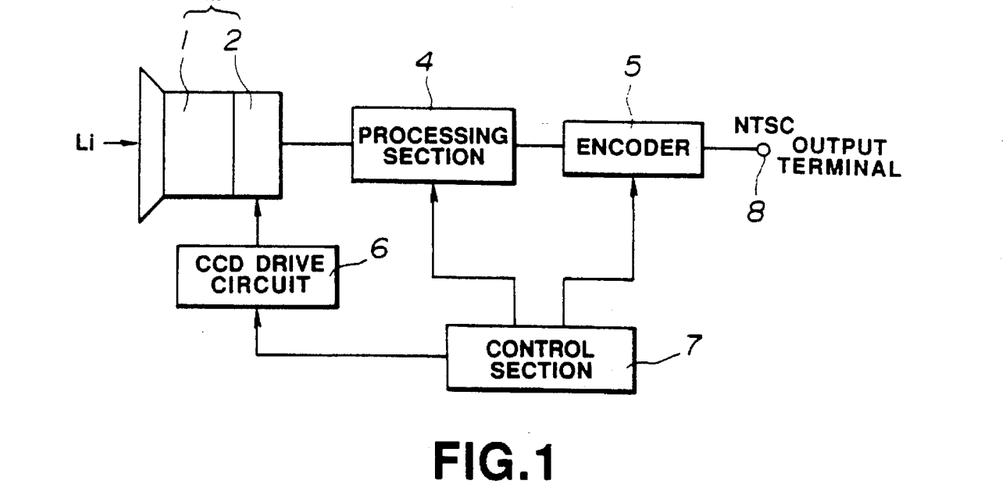
FIG. 1 is a block diagram showing the configuration of a solid-state imaging apparatus according to this invention.

A solid-state imaging apparatus using the invention is constructed as shown in FIG. 1, for example.

The solid-state imaging apparatus shown in FIG. 1 is applied to a colour television camera apparatus adapted to pick up three primary colour images of an object by a CCD (Charge Coupled Device) image sensor 2 of an imaging section 3 to which an image pickup light $L_i$ is incident through an image pickup optical system 1 to output television signals in conformity with the NTSC (National Television System Committee) system. It comprises a signal processing section 4 supplied with image pickup signals from the imaging section 3, an encoder 5 supplied with image pickup signals which are processed by the signal processing section 4, a CCD drive circuit 6 for driving the CCD image sensor 2, and a control section 7 for controlling the operations of these various circuit blocks, and the like.

Figure 2:
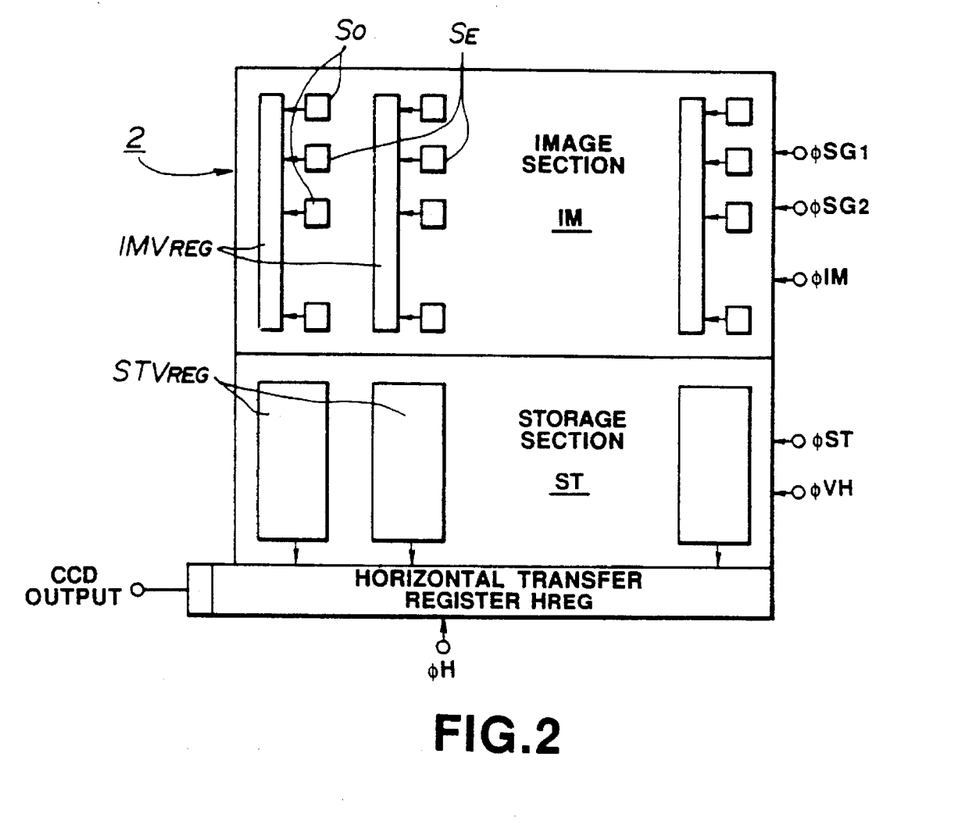
FIGS. 2 and 2A are diagrammatic plan views showing the configuration of CCD image sensors of the frame interline transfer type used in the above-mentioned solid-state imaging apparatus.
Figure 2A:
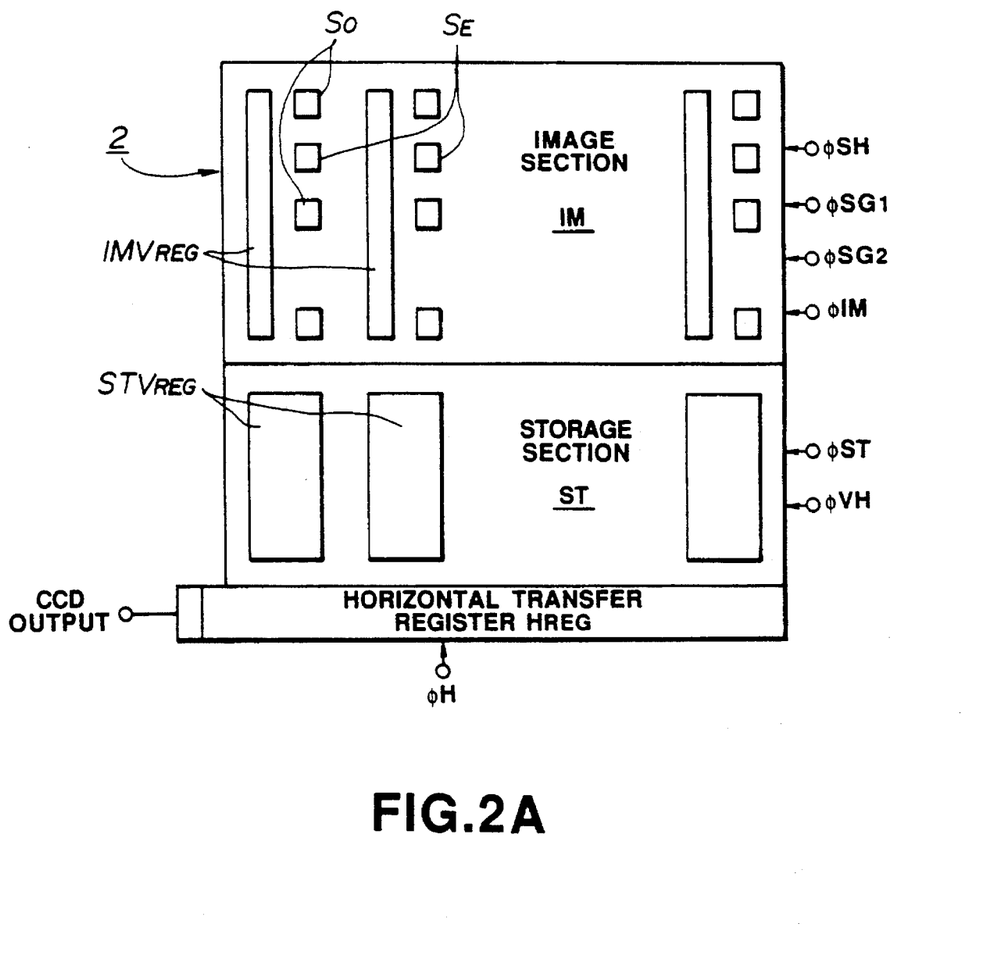

In this solid-state imaging apparatus, the CCD image sensor 2 included in the imaging section 3 is a so-called frame interline transfer (FIT) type CCD image sensor including, as shown in FIG. 2, an imaging section IM in which photoelectric conversion elements $S_O$, $S_E$ such as photodiodes, corresponding to respective pixels of images of odd fields and even fields are respectively arranged in a matrix form on the imaging surface, and a storage section ST to which storage charges obtained by respective photoelectric conversion elements S of the imaging section IM are transferred through vertical transfer registers $IMV_{REG}$. This CCD image sensor 2 is adapted to be driven by the CCD drive circuit 6, whereby image pickup charges obtained by the photoelectric conversion elements $S_O$, $S_E$ arranged in a matrix form are transferred from the vertical transfer registers $IMV_{REG}$ of the imaging section IM to the vertical transfer registers $STV_{REG}$ of the storage section ST through transfer gates SG every vertical blanking period, and are line-sequentially read out by one line through the vertical transfer registers $STV_{REG}$ of the storage section ST and the horizontal transfer register $H_{REG}$ during an image period.

Where an electronic shutter function is provided the CCD image sensor 2 is adapted as shown in FIG. 2A so that a shutter pulse $\Phi SH$ may be applied to the substrate or base of the sensor body from the CCD drive circuit 6, whereby image pickup images obtained by respective photoelectric conversion elements $S_O$, $S_E$ of the imaging section IM are swept away into an overflow drain.

The signal processing section 4, of FIG. 1 forms image pickup signals to which a signal processing such as a gamma ($\gamma$) correction is implemented with respect to image pickup signals read out from the CCD image sensor 2 to deliver those processed signals to the encoder 5. The encoder 5 forms television signals in conformity with the NTSC system from the image pickup signals delivered from the signal processing section 4 to output them from an output terminal 8.

Turning to the operation of the CCD in more detail, the CCD drive circuit 6 delivers, to the CCD image sensor 2, on the basis of a timing signal given by the control section 7, various control pulses including: sensor gate pulses $\Phi SG_1$, $\Phi SG_2$ for transferring (reading out) to the vertical transfer registers $IMV_{REG}$ the image pickup charges obtained by respective photoelectric conversion elements $S_O$, $S_E$ in the imaging section IM; a vertical transfer pulse $\Phi IM$ for transferring, in a vertical direction, signal charges in the vertical transfer registers $IMV_{REG}$ of the imaging section IM; a vertical transfer pulse $\Phi ST$ for transferring, in a vertical direction, signal charges in the vertical transfer registers $STV_{REG}$ of the storage section ST; a transfer pulse $\Phi VH$ for transferring signal charges from the vertical transfer registers $STV_{REG}$ of the storage section ST to the horizontal transfer register $H_{REG}$; and a horizontal transfer pulse $\Phi H$ for transferring, in a horizontal direction, signal charges in the horizontal transfer registers $H_{REG}$, as well as the shutter pulses (where provided).

On the basis of a system clock of the solid-state imaging apparatus, the control section 7 delivers a synchronizing signal and a blanking signal, etc. to the encoder 5, and delivers various timing signals to the signal processing section 4 and the CCD drive circuit 6. This control section 7 is adapted so that the operational mode may be switched between several modes by a system controller (not shown). To assist understanding, field and frame readout modes and an electronic shutter operation as mentioned above will be described in more detail, before describing operation modes according to two embodiments of the invention.

The field readout mode will be described in more detail with reference to FIG. 6.

In this mode, the CCD drive circuit 6 delivers, at the same time, to the imaging section IM, sensor gate pulses $\Phi SG_1$, $\Phi SG_2$ during the vertical blanking period $T_{VBLK}$ every field to allow the vertical registers $IMV_{REG}$ to transfer image pickup charges $A_i$ obtained by photoelectric conversion elements $S_O$ of odd columns and image pickup charges $B_i$ obtained by photoelectric conversion elements $S_E$ of even columns. As mentioned above, charges from pairs of adjacent odd and even elements are combined with the combinations being changed every field to thereby read out image pickup charges $(A_i+B_i)$ then $(B_i+A_{i+1})$ corresponding to the interline scanning in the field readout mode. These charges are transferred to the vertical transfer registers $IMV_{REG}$.

Immediately before the timings of the sensor gate pulses $\Phi SG_1$, $\Phi SG_2$ high speed vertical transfer pulses $\Phi IM$, $\Phi ST$ are delivered to the vertical transfer registers $IMV_{REG}$ of the imaging section IM and the vertical transfer registers $STV_{REG}$ of the storage section ST to allow the vertical transfer registers $STV_{REG}$ of the storage section ST to transfer, at a high speed, unnecessary charges such as a smear components, etc. in the vertical transfer registers $IMV_{REG}$ of the imaging section IM. By this high speed transfer operation, the vertical transfer registers $IMV_{REG}$ of the imaging section IM are brought into an empty state where unnecessary charges are swept out therefrom.

Further, immediately before the timings of the sensor gate pulses $\Phi SG_1$, $\Phi SG_2$, the CCD drive circuit 6 delivers high speed vertical transfer pulses $\Phi IM$, $\Phi ST$ to the vertical transfer registers $IMV_{REG}$ the imaging section IM and the vertical transfer registers $STV_{REG}$ of the storage section ST to transfer at a high speed image charges $A_i+B_i$, $B_i+A_{i+1}$ from the vertical transfer registers $IMV_{REG}$ Of the imaging section IM to the vertical transfer registers $STV_{REG}$ of the storage section ST.

The signal charges $A_i+B_i$, $B_i+A_{i+1}$ which have been transferred at a high speed to the vertical transfer registers $STV_{REG}$ of the storage section ST are line-sequentially read out through the horizontal transfer register $H_{REG}$ in a later readout period (image period).

The image pickup signal which has been read out from the solid-state image sensor 1 is delivered to the encoder 5 though the signal processing section 4, at which it is encoded so that a television signal in conformity with a desired (e.g. NTSC) system is provided. The signal thus obtained is outputted from the output terminal 8.

Figure 8:
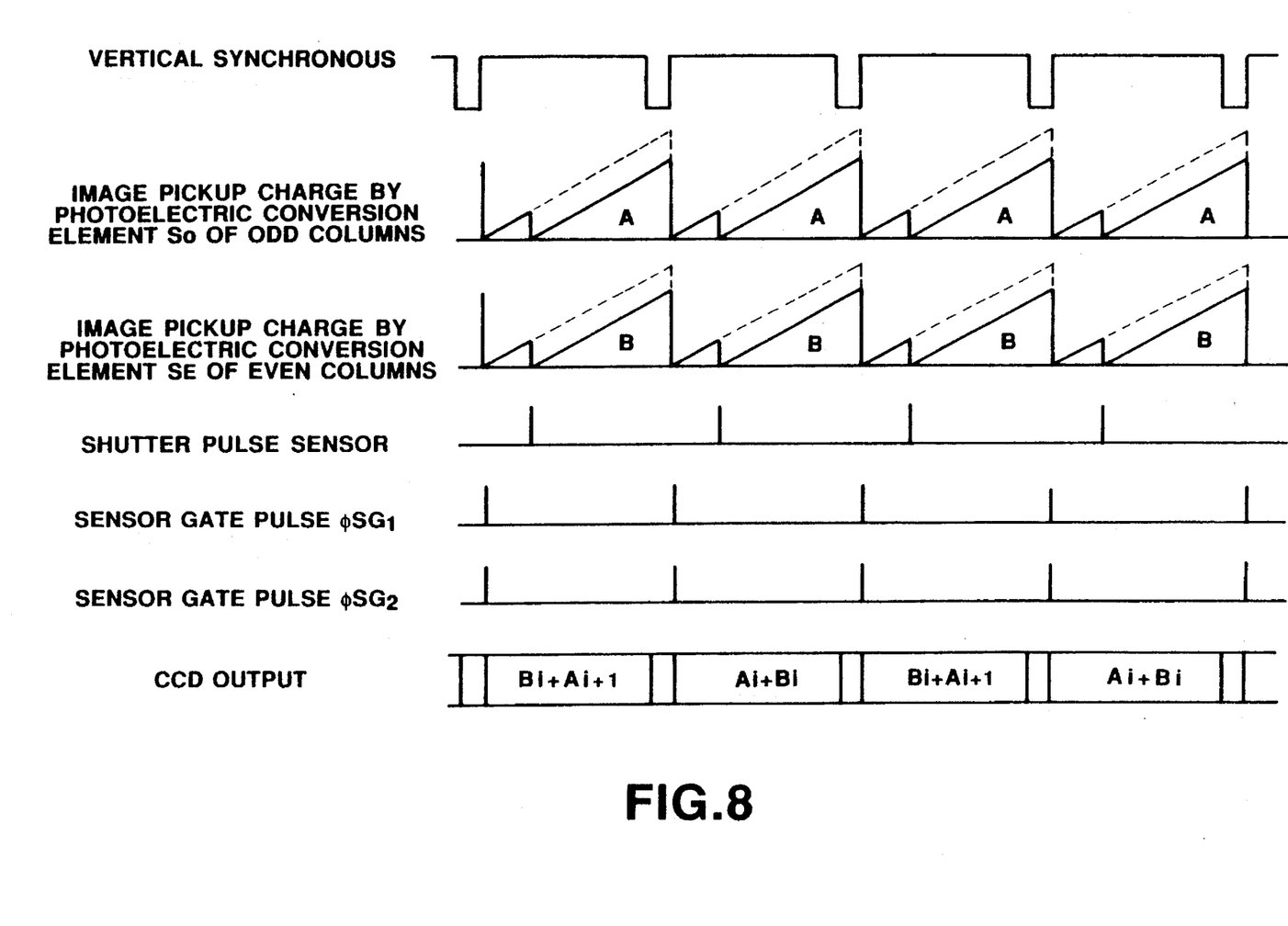
FIG. 8 is a timing chart showing operation in a field readout mode with a shutter function.

This mode may also have an electronic shutter operation in which the CCD drive circuit 6 applies a shutter pulse $\Phi SH$ to the substrate or base of the CCD image sensor 2 in the middle of an image period as shown in FIGS. 2A and 8. Thus, in the CCD image sensor 2, image pickup charges obtained by respective photoelectric conversion elements $S_O$, $S_E$ of the imaging section IM are swept away into the overflow drain at every application of the shutter pulse $\Phi SH$. As a result, the effective charge storage period $T_{EXP}$ following the shutter pulse is variably controlled by varying the timing of the shutter pulse.

Similarly to the non-shutter operation the CCD drive circuit 6 delivers sensor gate pulses $\Phi SG_1$, $\Phi SG_2$ in the state where the vertical transfer registers $IMV_{REG}$ are caused to be empty (by high speed vertical transfer pulses $\Phi IM$, $\Phi ST$) to thereby allow the vertical transfer registers $IMV_{REG}$ to transfer image pickup charges $A_i$, $B_i$ (or $B_{i+1}$) obtained by the photoelectric conversion elements in the imaging section IM with the combinations of image pickup charges of respective corresponding odd and even columns being changed one after another every field. These are transferred to the vertical transfer registers $STV_{REG}$ of the storage section ST, at a high speed and are read out through the horizontal transfer register $H_{REG}$ in a later readout period (image period).

Thus, in this mode, it is possible to variably control the effective charge storage period $T_{EXP}$ by the electronic shutter function. The image pickup signal which has been read out from the solid-state image sensor 1 is delivered to the encoder 5 through the signal processing section 4, at which it is encoded so that a television signal in conformity with a desired system is provided. The signal thus obtained is outputted from the output terminal 8.

The second operational mode is a frame readout mode and this will be described with reference to FIG. 7.

In this second operational mode, the CCD drive circuit 6 delivers, to the imaging section IM, sensor gate pulses $\Phi SG_1$, $\Phi SG_2$ one after another every field during the vertical blanking period $T_{VBLK}$ to allow the vertical transfer registers $IMV_{REG}$ to receive image pickup charges obtained by photoelectric conversion elements $S_O$ of odd columns and image pickup charges $B_i$ obtained by photoelectric conversion elements $S_E$ of even columns one after another every field. These image pickup charges $A_i$, $B_i$ corresponding to the interline scanning in the frame readout mode are then read out.

It is to be noted that, also in this second operational mode, immediately before the timings of the sensor gate pulses $\Phi SG_1$, $\Phi SG_2$, high speed vertical transfer pulses $\Phi IM$, $\Phi ST$ are respectively delivered to the vertical transfer registers $IMV_{REG}$ of the imaging section IM and the vertical transfer registers $STV_{REG}$ of the storage section ST to transfer, at a high speed, unnecessary charges such as smear components, etc. from the vertical transfer registers $IMV_{REG}$ of the imaging section IM to the vertical transfer registers $STV_{REG}$ of the storage section ST. By this high speed transfer operation, the vertical transfer registers $IMV_{REG}$ of the imaging section IM are placed in an empty state where any unnecessary charges are swept out therefrom.

Then, the CCD drive circuit 6 delivers the sensor gate pulses $\Phi SG_1$, $\Phi SG_2$ in the state where the vertical transfer registers $IMV_{REG}$ are empty.

That is, immediately before the timings of the sensor gate pulses $\Phi SG_1$, $\Phi SG_2$, the CCD drive circuit 6 delivers high speed vertical transfer pulses $\Phi IM$, $\Phi ST$ to the vertical transfer registers $IMV_{REG}$ of the imaging section IM and the vertical transfer registers $STV_{REG}$ of the storage section ST to transfer, at a high speed, charges $A_i$, $B_i$ in the vertical transfer registers $IMV_{REG}$ of the imaging section IM to the vertical transfer registers $STV_{REG}$ of the storage section ST.

The signal charges $A_i$, $B_i$ which have been transferred at a high speed to the vertical transfer registers $STV_{REG}$ of the storage section ST are read out through the horizontal transfer register $H_{REG}$ for a later readout period.

An image pickup signal read out from the solid-state image sensor 1 is delivered to the encoder 5 through the signal processing section 4, at which it is encoded so that a television signal in conformity with a desired system is provided. The signal thus obtained is outputted from the output terminal 8.

Having described these modes, two modes of operation according to the present invention will now be described.

Figure 3:
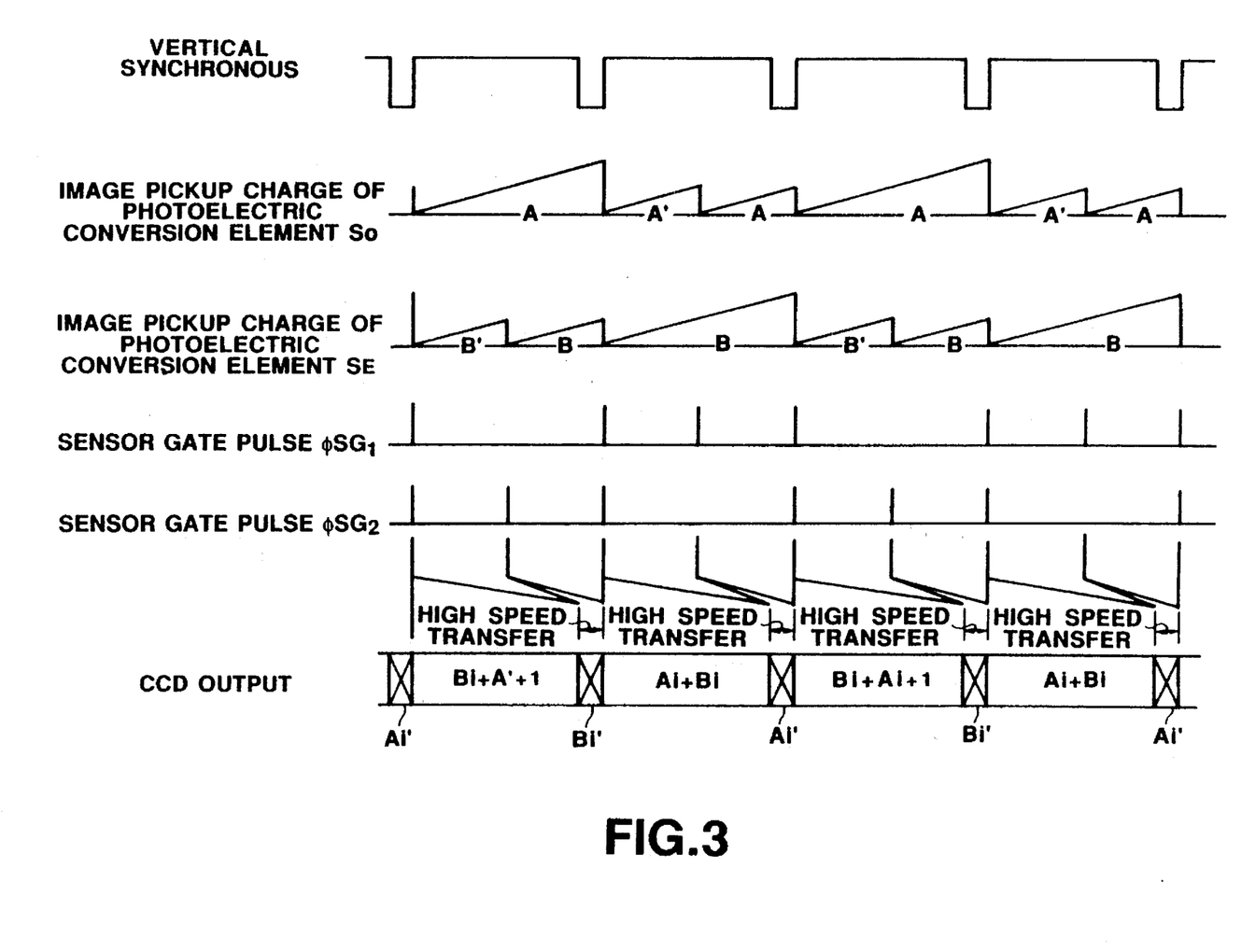
FIG. 3 is a timing chart showing the operation of the above-mentioned solid-state imaging apparatus according to a first embodiment of the invention.

In the first embodiment, as shown in FIG. 3, the CCD drive circuit 6 delivers, to the imaging section IM, sensor gate pulses $\Phi SG_1$, $\Phi SG_2$ during a vertical blanking period $T_{VBLK}$ every field. These are adapted, to cause the vertical transfer registers $IMV_{REG}$ to transfer image pickup charges $A_i$ obtained by photoelectric conversion elements $S_O$ of odd columns and image pickup charges $B_i$ obtained by photoelectric conversion elements $S_E$ of even columns during a vertical blanking period $T_{VBLK}$ every field to the vertical transfer register $IMV_{REG}$. As before, signals from pairs of adjacent elements are combined with the pairing of the image pickup elements being alternated every field to thereby read out image pickup charges $A_i+B_i$, and then $B_i+A_{i+1}$ corresponding to the interline scanning in the field readout mode.

Also as before, immediately before the timings of sensor gate pulses $\Phi SG_1$, $\Phi SG_2$ that is, every respective vertical blanking periods $T_{VBLK}$, high speed vertical transfer pulses $\Phi IM$, $\Phi ST$ are respectively delivered to the vertical transfer registers $IMV_{REG}$ of the imaging section IM and the vertical transfer registers $STV_{REG}$ of the storage section ST to clear the registers. Thus the sensor gate pulses $\Phi SG_1$, $\Phi SG_2$ are applied in the state where the vertical transfer registers $IMV_{REG}$ are empty.

Similarly, immediately after the timings of the sensor gate pulses $\Phi SG_1$, $\Phi SG_2$, the CCD drive circuit 6 delivers the high speed vertical transfer pulses $\Phi IM$, $\Phi ST$ to the vertical transfer registers $IMV_{REG}$ Of the imaging section IM and the vertical transfer register $STV_{REG}$ of the storage section ST, thus to transfer, at a high speed, charges $A_i+B_i$, $B_i+A_{i+1}$ in the vertical transfer registers $IMV_{REG}$ of the imaging section IM to the vertical transfer registers $STV_{REG}$ of the storage section ST.

In this embodiment, and as shown in FIG. 3, during high speed transfer period by the vertical transfer registers $STV_{REG}$, the horizontal transfer pulse $\Phi H$ is also caused to be a high speed pulse to thereby sweep out unnecessary charges by high speed transfer through the horizontal transfer register $H_{REG}$. Thus, image pickup charges $A_i$, of photoelectric conversion elements $S_O$ of odd columns and image pickup charges $B_i$, of even columns are read out to the vertical transfer register $IMV_{REG}$ of the imaging section IM by delivering sensor gate pulses $\Phi SG_1$, $\Phi SG_2$ to the imaging section IM one after another every field during image periods of respective fields are swept out as unnecessary charges. Accordingly, a large quantity of unnecessary charges will be produced. However, by the above-mentioned high speed transfer, it is possible to sweep out such a large quantity of unnecessary charges through the horizontal transfer register $H_{REG}$.

Namely, the horizontal transfer register $H_{REG}$ can sweep out a large quantity of unnecessary charges by increasing the number of transfer times by the high speed transfer even if a quantity of charges transferred every transfer is small.

Also in this embodiment the sensor gate pulses $\Phi SG_1$, $\Phi SG_2$ delivered to the imaging section IM are adapted as shown in FIG. 3 to carry out a dummy readout alternately of image pickup charges $A_i$ obtained by photoelectric conversion elements $S_O$ of odd columns in one field and then image pickup charges $B_i$ obtained by photoelectric conversion elements $S_E$ of even columns in the next field. Thus for each of the odd elements and even elements in every alternate period between the successive sensor gate pulses an additional sensor gate pulses is applied. The extra pulses alternate between the odd and even elements so that in one field the odd elements have the extra pulse and in the next field the even elements have it. As the signals from odd and even elements are then paired these extra pulses make it possible to change the additive mixing ratio of image pickup charges $A_i+B_i$, $B_i+A_{i+1}$ every field from the additive mixing ratio of 1:1 for an ordinary field readout mode. With the arrangement shown in FIG. 3 the above-mentioned additive mixing ratio is, 1:2, as for the element to which the extra pulse is supplied, half the charge accumulated ($A_i$, $B_i$) is discarded by using the above-mentioned high speed pulse and only half is added to the charge ($B_i$,$A_i$) from the other element which has been accumulating for twice as long.

The signals are line-sequentially read out through the horizontal transfer register $H_{REG}$ from the vertical transfer registers $STV_{REG}$ of the storage section ST during an image period to thereby obtain an image pickup output corresponding to the interlaced scanning in the field readout mode. Then, an image pickup signal read out from the solid-state image sensor 1 is delivered to the encoder 5 through the signal processing section 4, at which it is encoded so that a television signal in conformity with the NTSC system is provided. The signal thus obtained is outputted from the output terminal 8.

Figure 4:
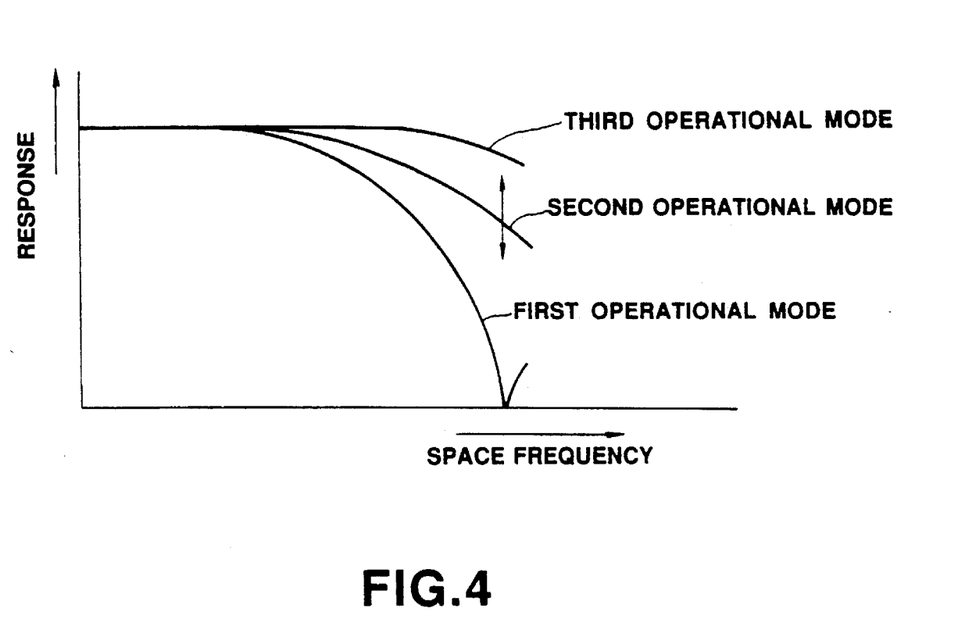
FIG. 4 is a characteristic diagram showing a vertical MTF characteristic of image pickup signals obtained by the above-mentioned imaging apparatus.

By varying the additive mixing ratio between image pickup charges $A_i$ obtained by photoelectric conversion elements $S_O$ of odd columns and image pickup charges $B_i$ obtained by photoelectric conversion elements $S_E$ of even columns in this way, it is possible, as shown in FIG. 4, to obtain an intermediate vertical resolution (MTF) between a vertical resolution in the first operational mode, i.e., an ordinary field readout mode and that in the second operational mode, i.e., the frame readout mode. Assuming now that the above-mentioned additive mixing ratio is, for example, 1:2, an image pickup output corresponding to the interlaced scanning in the field readout mode is provided, thereby making it possible to improve a vertical resolution as compared to the ordinary field readout mode. In addition, the dynamic range and the sensitivity can be maintained at 75%, thus making it possible to improve the dynamic range and the sensitivity to a greater degree as compared to the frame readout mode.

As is clear from the foregoing description, in the solid-state imaging apparatus according to this embodiment of the invention, image pickup charges alternately obtained by photoelectric conversion elements of odd columns and image pickup charges obtained by photoelectric conversion elements of even columns of a solid-state image sensor of the frame interline transfer type are read-out one after another every field in the middle of an image period, thereby making it possible to independently vary effective charge storage periods of respective photoelectric conversion elements in the pairs which are combined. This allows variation of vertical resolution in dependency upon the additive mixing ratio. During a vertical blanking period every field, image pickup charges read out to the vertical transfer registers of the imaging section one after another every field in the middle of the image period are transferred, at a high speed, from the vertical transfer registers of the imaging section to the vertical transfer registers of the storage section, and are further line-sequentially transferred at a high speed through the horizontal transfer register from the vertical transfer registers of the storage section. Image pickup charges thus transferred are swept out as unnecessary charges. As stated above, the horizontal transfer register can sweep out a large quantity of unnecessary charges during a vertical blanking period every field by increasing the number of transfer times by the high speed transfer even if a quantity of charges transferred every transfer is small. This makes it possible to provide an image pickup output in which the degree of lowering of the vertical resolution (MTF) is less than in the case of the field readout mode, an after-image is less than that in the case of the frame readout, and the dynamic range is wide.

Figure 5:
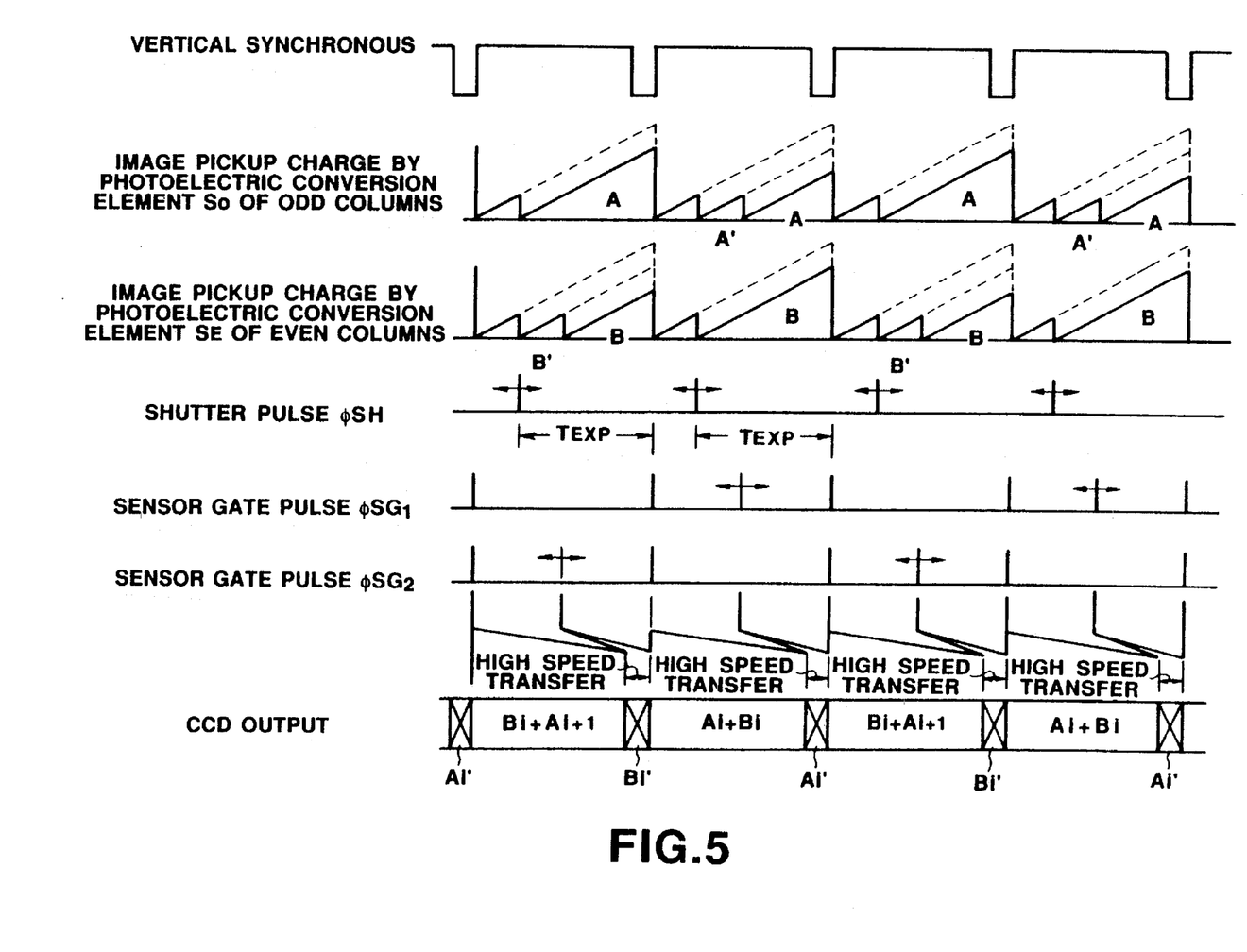
FIG. 5 is a timing chart showing operation of the above-mentioned solid-state imaging apparatus according to a second embodiment of the invention.

Now a second embodiment of the solid-state imaging apparatus according to this invention will be described with reference to FIG. 5.

In this embodiment, the CCD drive circuit 6 applies a shutter pulse ΦSH to the substrate of the CCD image sensor 2 at a variable time point during an image period. Thus, in the CCD image sensor 2, image pickup charges obtained by respective photoelectric conversion elements $S_0$, $S_E$ of the imaging section IM are swept away into the overflow drain on every shutter pulse ΦSH. As a result, the effective charge storage period $T_{EXP}$ is variably controlled.

Then, the CCD drive circuit 6 delivers, to the imaging section IM, sensor gate pulses ΦSG$_1$, ΦSG$_2$ as in the first embodiment during image period of respective fields in a manner to interleave with the shutter pulse ΦSH during image periods of respective fields. The sensor gate pulses ΦSG$_1$, ΦSG$_2$ are delivered during the vertical blanking period $T_{VBLK}$ every field to allow the vertical transfer registers IMV$_{REG}$ to transfer image pickup charges $A_i$ obtained by photoelectric conversion elements $S_0$ of odd columns and image pickup charges $B_i$ obtained by photoelectric conversion elements $S_E$ of even columns in pairs, with the pairings of the image pickup charges of respective corresponding odd and even columns being alternated every field, to thereby read out, to the vertical transfer registers IMV$_{REG}$, image pickup charges $A_i+B_i$ then $B_i+A_{i+1}$ corresponding to the interline scanning in the field readout mode.

As explained below, in this embodiment the sensor gate pulses are adapted to allow the additive mixing ratio of image pickup charges $A_i+B_i$ corresponding to the interline scanning to be fixed.

Also, as before, immediately before the timings of sensor gate pulses ΦSG$_1$, ΦSG$_2$, that is, in every respective vertical blanking periods $T_{VBLK}$, high speed vertical transfer pulses ΦIM, ΦST are respectively delivered to the vertical transfer registers IMV$_{REG}$ of the imaging section IM and the vertical transfer registers STV$_{REG}$ of the storage section ST to allow the vertical transfer registers STV$_{REG}$ of the storage section ST to transfer, at a high speed, unnecessary charges such as smear components, etc. from the vertical transfer register of the imaging section IM.

Further, immediately after the timings of the sensor gate pulses ΦSG$_1$, ΦSG$_2$, the CCD drive circuit 6 delivers high speed vertical transfer pulses ΦIM, ΦST to the vertical transfer registers IMV$_{REG}$ of the imaging section IM and the vertical transfer register STV$_{REG}$ of the storage section ST, to allow the vertical transfer registers STV$_{REG}$ of the storage section ST to transfer, at a high speed, image charges $A_i+B_i$ from the vertical transfer registers IMV$_{REG}$ of the imaging section IM.

According to the invention, while the effective charge storage period $T_{EXP}$ is variable by the control of the electronic shutter function, during image periods of respective fields, sensor gate pulses ΦSG$_1$, ΦSG$_2$ are delivered to the imaging section IM one after another every field which carry out a dummy readout of image pickup charges $A_i$ obtained by photoelectric conversion elements $S_0$ of odd columns and image pickup charges $B_i$ obtained by photoelectric conversion elements $S_E$ of even columns one after another every field. This consists of the additional application in alternate periods between successive sensor gate signals, both in ΦSG$_1$, ΦSG$_2$, of a variably-timed extra sensor gate pulse as shown in FIG. 5. The extra pulse alternates between odd and even elements as before, thereby making it possible to change the additive mixing ratio of image pickup charges $A_i+B_i$ every field from the additive mixing ratio of 1:1 in an ordinary field readout mode. The above-mentioned additive mixing ratio may be changed, for example, to 1:2.

By varying the additive mixing ratio between image pickup charges $A_i$ obtained by photoelectric conversion elements $S_0$ of odd columns and image pickup charges $B_i$ obtained by photoelectric conversion elements $S_E$ of even columns in this way, it is possible to obtain, as shown in FIG. 4, an intermediate vertical resolution (MTF) between a vertical resolution in the first operational mode, i.e., an ordinary field readout mode and that in the second operational mode, i.e., the frame readout mode.

Further, the dynamic range and the sensitivity can be maintained at 75%, thus making it possible to improve the dynamic range and the sensitivity to a greater degree as compared to the second operational mode, i.e., the frame readout mode. In addition, in the case where the effective charge storage period $T_{EXP}$ is caused to be variable by the control of the electronic shutter function, sensor gate pulses ΦSG$_1$, ΦSG$_2$ delivered one after another every field to the imaging section IM during image periods of respective fields are caused to interleave with the shutter pulse ΦSH, resulting in no possibility that the vertical resolution (MTF) is changed by the above-mentioned shutter function because the additive mixing ratio is effectively fixed irrespective of the control of the electronic shutter function.

As is clear from the foregoing description, in the solid-state imaging apparatus according to this embodiment of the invention, it is possible to provide an image pickup output in which the degree of lowering of the vertical resolution (MTF) is less than that in the case of the field readout mode, an after-image is less than that in the case of the frame readout mode, and the dynamic range is wide. Further, by using the image sensor drive control means the electronic shutter function is controlled to carry out an imaging operation in which the effective charge storage period is caused to be variable by the control of the electronic shutter function without change of the vertical resolution (MTF).

Accordingly, in accordance with this invention, there can be provided a solid-state imaging apparatus in which the vertical resolution can be varied without damaging the dynamic resolution by a solid-state image sensor having an electronic shutter function.

We claim:

1. A solid-state imaging apparatus comprising:
    a solid-state image sensor in which a plurality of photoelectric conversion elements for storing charge in response to illumination by image light are arranged in a matrix form having odd and even lines; and
    image sensor drive control means for applying read-out pulses to the plurality of photoelectric conversion elements for every video field and to add, for every video field, image pickup charges obtained from pairs of the plurality of photoelectric conversion elements, the pairs comprising a photoelectric conversion element from each of an adjacent odd and even line, and to output an image signal, wherein the image sensor drive control means changes effective charge storage periods of the plurality of photoelectric conversion elements in respective odd and even lines independently to vary the respective contributions of the odd and even lines of the plurality of photoelectric conversion elements to the image signal, wherein the image sensor drive control means varies the effective charge storage periods by applying to the plurality of photoelectric conversion elements additional read-out pulses in between the aforementioned read-out pulses, and wherein the additional read-out pulses are applied to each field alternately to the odd and even lines of the plurality of photoelectric conversion elements.

2. A solid-state imaging apparatus according to claim 1 in which the charge read out by the additional read-out pulses is swept out by a high speed transfer from the image sensor.

3. A solid-state imaging apparatus according to claim 1 wherein the additional read-out pulses are supplied substantially in the middle of the imaging period whereby the mixing ratio of signals from the odd and even lines of the plurality of photoelectric conversion elements is 1:2.

4. A solid-state imaging apparatus according to claim 1 in which the image sensor drive control means varies the pairing of photoelectric conversion elements whose outputs are added by adding in a first field the signal from an element in a first line to the signal from the corresponding element in the preceding adjacent line, and in the next field adding the signal from the element in the first line to the signal from the corresponding element in the next succeeding line.

5. A solid-state imaging apparatus according to claim 1 wherein the image sensor drive control means supplies to the image sensor an electronic shutter signal effective to sweep out image pickup charges into an overflow drain to cause effective charge storage periods of the plurality of photoelectric conversion elements to be independently variable.

6. A solid-state imaging apparatus according to claim 5 in which the image sensor drive control means causes the independent variation of the effective charge storage periods by applying additional read-out signals between the aforementioned read-out signals selectively to the lines in the matrix in timed relation to the electronic shutter signal.

7. A solid-state imaging apparatus according to claim 6, wherein the additional read-out signal follows the electronic shutter signal.

8. A solid-state imaging apparatus according to claim 6, wherein the image sensor drive control means is adapted to generate the additional read-out signal at a timing which maintains constant the ratio of signals from the elements in the pairs of photo-electric conversion elements.

9. A solid-state imaging apparatus comprising:

a solid-state image sensor in which a plurality of photoelectric conversion elements for storing charges in response to illumination by image light are arranged on a substrate in a matrix form having odd and even lines; and image sensor drive control means for applying first read-out pulses to said solid-state image sensor for each field so as to form effective charge storage periods and for applying second read-out pulses arranged between said first read out pulses so as to independently vary the effective charge storage periods of each of said odd and even lines of the photoelectric conversion elements, said second read-out pulses being applied to said solid-state image sensor in each field alternately to the odd and even lines of the photoelectric conversion elements; and wherein said image sensor drive control means applies an electronic shutter signal to said solid-state image sensor to affect simultaneously both said odd and even lines of said photoelectric conversion elements of said image sensor to sweep out image pickup charges into an overflow drain and to allow said effective charge storage periods of said odd and even lines of photoelectric conversion elements to be independently varied by applying said second read-out pulses between said first read-out pulses in timed relation to the electronic shutter signal; and wherein said image sensor drive control means applies said first and second read-out pulses to said solid-state image sensor to add for every field image pick-up charges obtained from pairs of photoelectric conversion elements from each of an adjacent odd and even line, in which a pairing of photoelectric conversion elements whose charges are added is varied by adding in a first field the charge from an element in a first line to the charge from the corresponding element in the preceding adjacent line, and in a second field by adding the charge from the element in the first line to the charge from the corresponding element in the next succeeding line.

10. A solid-state imaging apparatus according to claim 9, wherein the second read-out pulses follow the electronic shutter signal.

11. A solid-state imaging apparatus according to claim 9, wherein the image sensor drive control means generates the second read-out pulses at a timing which maintains constant a mixing ratio of signals from the elements in the pairs of the plurality of photoelectric conversion elements.

12. A solid-state imaging apparatus according to claim 9, wherein the image sensor drive control means generates the second read-out pulses at a timing which maintains a 1:2 mixing ratio of signals from the odd and even lines of the plurality of photoelectric conversion elements.

* * * * *